Patented July 16, 1929.

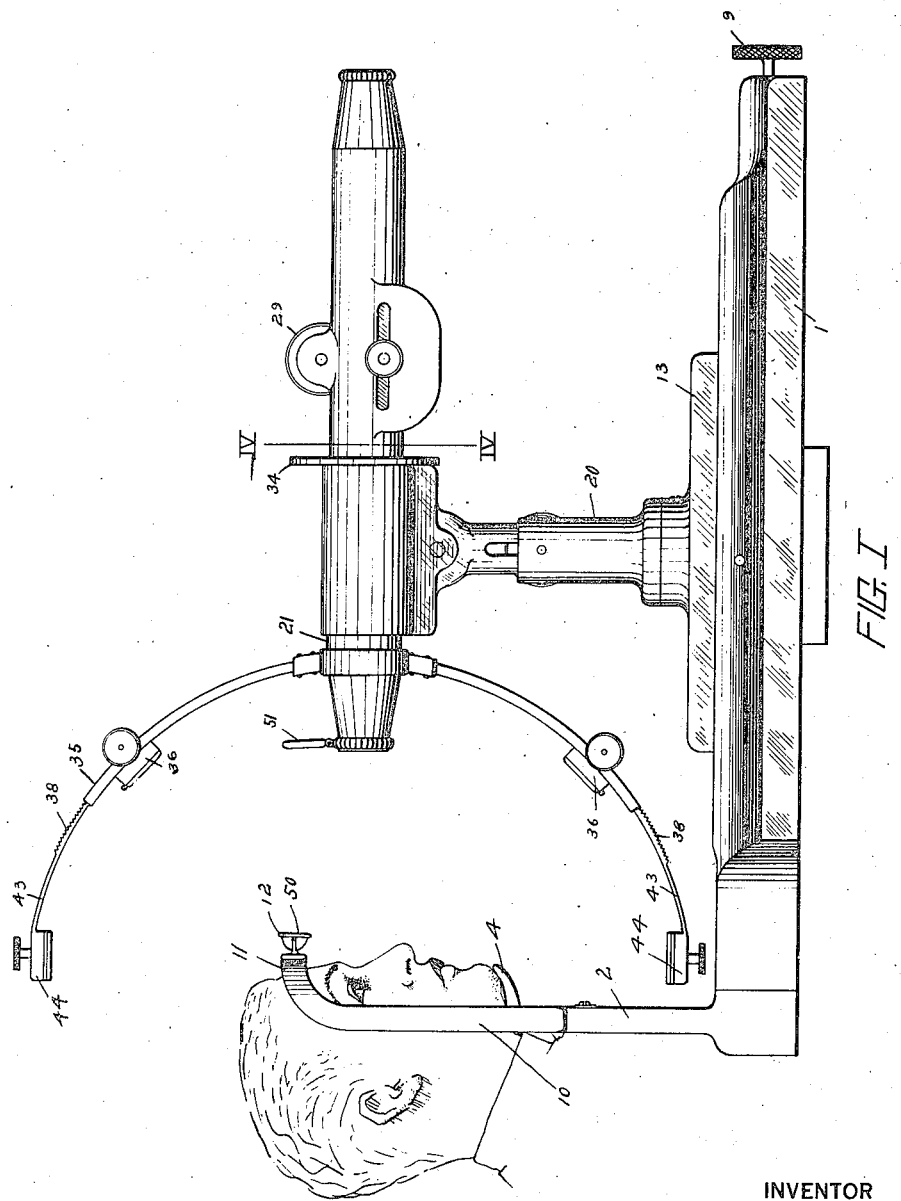

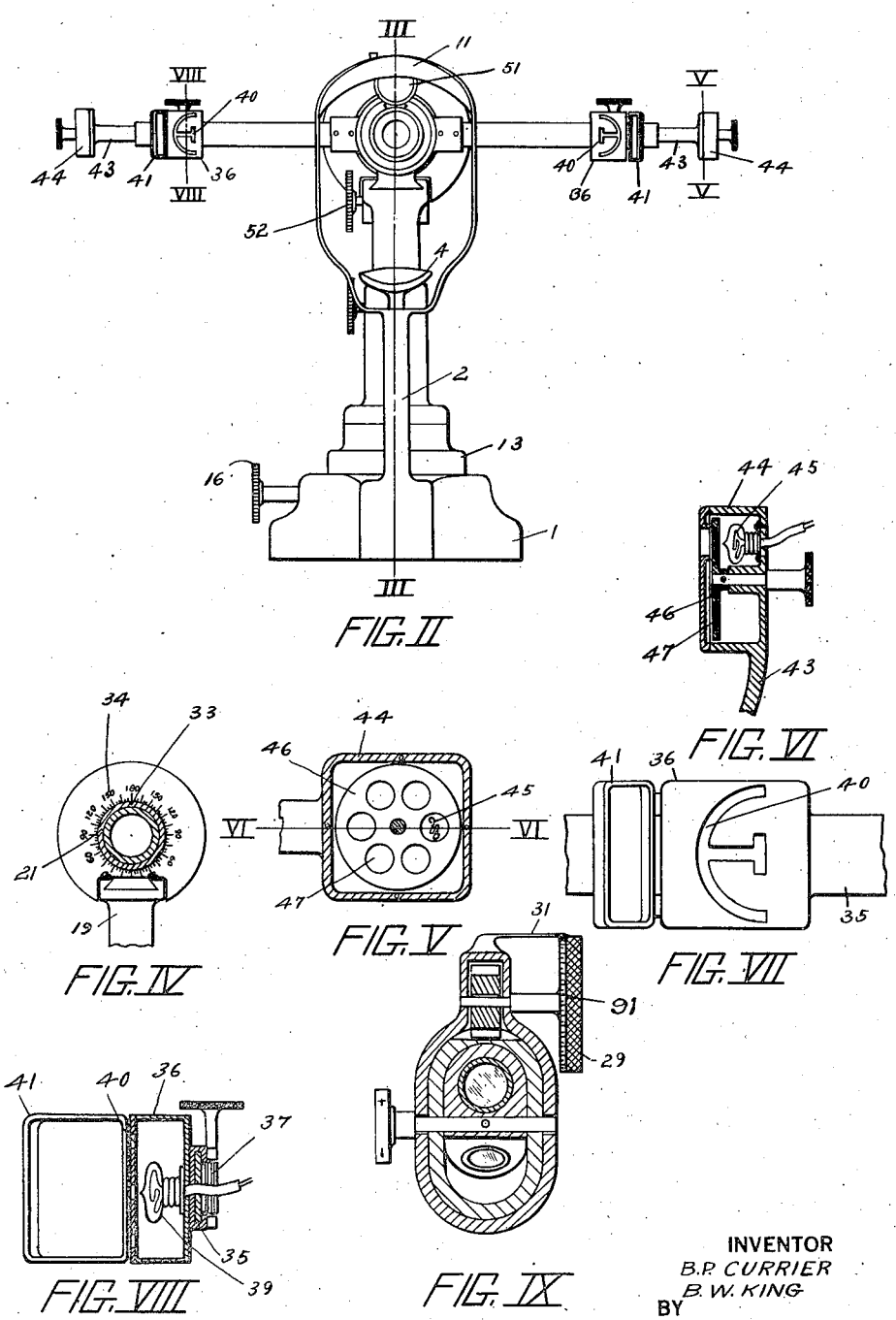

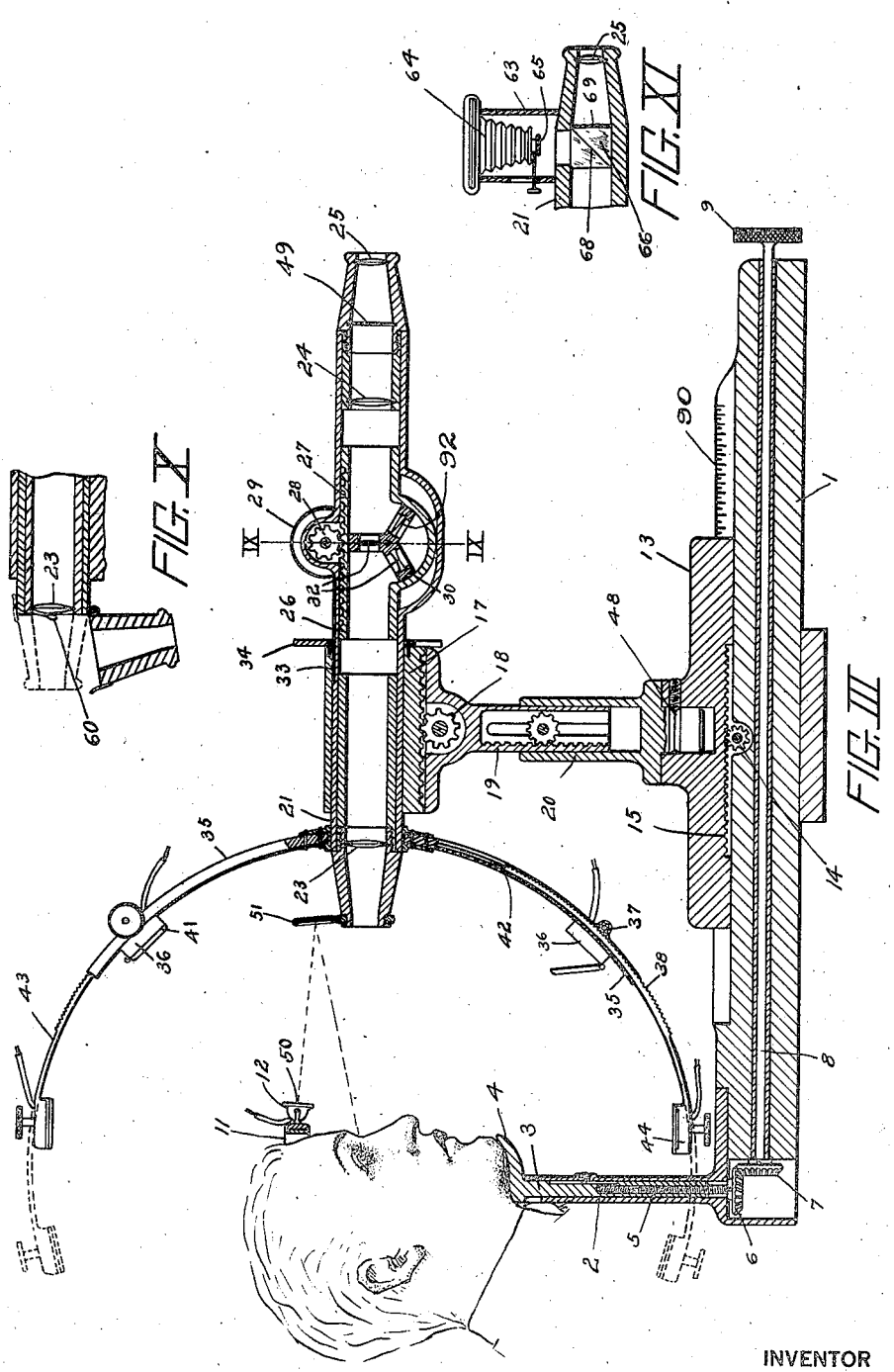

1,721,208

UNITED STATES PATENT OFFICE.

BERNARD P. CURRIER AND BURNHAM W. KING, OF NEW YORK, N. Y., ASSIGNORS TO AMERICAN OPTICAL COMPANY, OF SOUTHBRIDGE, MASSACHUSETTS, A VOLUNTARY ASSOCIATION OF MASSACHUSETTS.

EYE-EXAMINING INSTRUMENT.

Application filed December 18, 1922. Serial No. 607,669.

This invention relates to eye examining instruments, and has for its principal object the provision of an improved form of combination instrument which may be employed for several methods or forms of eye examination, to both determine certain of the visual properties of the eye, and also the physical condition of various portions thereof.

A further object of the invention is the provision of an improved instrument which may be so selectively adjusted as to permit of measurement of either the front surface of the eye or the interior thereof, as may be preferred.

Another object of the invention is the provision of an improved instrument in which the patient may be placed in fixed position relative to the instrument and all desired corneal microscopic and ophthalmoscopic work may be performed by the person making the test without change of instrument or change of position of the patient.

A further object of the present invention is to provide an instrument which may be employed selectively as either an ophthalmometer, ophthalmoscope, corneal microscope, or perimeter, to enable the eyesight specialist to make most thorough and rapid, accurate examination of the eye of the patient.

An additional object of the present invention is the provision of an instrument which may be satisfactorily employed not only for examination of the fundus oculi but also for photographically recording that which is seen, and in which such photographic record may be made while the eye is actually under observation if desired.

Other objects and advantages of our invention should be readily apparent by reference to the following specification taken in connection with the accompanying drawings, and it will be understood that we may make any modifications in the specific features of construction shown and described within the scope of the appended claims without departing from or exceeding the spirit of our invention.

Figure I represents a side elevation of our instrument illustrating its use.

Figure II represents a view from the patient's side thereof.

Figure III represents a sectional view as on the line III—III of Figure II.

Figure IV represents a sectional view as on the line IV—IV of Figure I.

Figure V represents a fragmentary sectional view taken as on the line V—V of Figure II.

Figure VI represents a sectional view on the line VI—VI of Figure V.

Figure VII represents a face view of one of the mires.

Figure VIII represents a sectional view of the mire arrangement as on the line VIII—VIII of Figure II.

Figure IX represents a sectional view taken as on the line IX—IX of Figure III.

Figure X represents a fragmentary view of the front end of the telescope showing a hinged construction.

Figure XI represents a detail view of the photographic mechanism.

In the drawings, in which similar characters of reference are employed to denote corresponding parts throughout the several views, the numeral 1 designates the body portion or base of the instrument, having rising therefrom at one end a standard 2, in which is slidably supported the post 3 having the chin rest bracket 4 vertically adjustable through the medium of the screw 5, having on its lower end a bevel gear 6 meshing with a second gear 7 on the shaft 8, which extends forward through the base and is operable from the front or eyesight specialist's end of the instrument, as by the knurled handle or thumb screw portion 9. It will thus be seen that turning of the member 9 serves to raise or lower the chin rest 4 to properly position the head of the person for height, while the upright 2 is provided with the side or wing portions 10 for engaging the sides of the face to further aid in this positioning, the parts 10 being connected by the temple band 11, which also serves as a support for the light 12 necessary in certain types of examination.

It will be noted by reference to the drawings that the chin rest 4 and also if desired the members 10 and 11 are provided with the replaceable paper lining or face contacting portion 12 so that absolute sanitation may be insured through changing of these sanitary linings between patients.

Slidably mounted upon the base 1 is the main carriage 13 of our improved instrument which is longitudinally adjustable on the base, as by the pinion 14 and rack 15, the pinion being actuatable as by the knurled wheel or handle member 16, and serving to feed the instrument back and forth. Indications or scale designations as at 90 serve to designate the position to which the carriage is to be adjusted, it being understood that it will be placed at its most forward position or most distant from the patient when used as an opthalmometer, in an intermediate position when serving as a corneal microscope, and still nearer the eye when in use as an ophthalmoscope, the general position of the instrument being preferably adjusted to definite position according to the purpose for which it is intended at the moment, and the final adjustment being obtained by in and out feeding movement of the upper head 17 controlled as by the pinion 18 and operating handle 52. This head, it will be noted, is carried by the vertically adjustable telescoping member 19 which fits into the supporting tube or post 20 of the carriage 13, the vertical adjustment serving to properly horizontally align the examining device carried by the head 17 with the eye of the patient as controlled by the position of the adjustable rest 4.

The head 17 has rotatably secured therein the telescope tube 21 provided with a suitable telescope lens system formed by the lenses 23, 24 and 25, held in fixed relation one to the other and an intermediate adjustable lens system which is also capable of variation in power. This lens system is carried in the supplemental slide 26 operated as by the rack 27 and pinion 28, the pinion being actuated by a handle member 29 having the graduations as at 91 cooperating with the pointer 31 on the tube 21 to indicate in dioptric or other units the power value adjustment attained by backward or forward movement of the supplemental tube 26 and parts carried thereby when the device is being used as an ophthalmoscope, or the like. This supplemental tube member is provided with the three bladed carrier 30, each blade or arm having an aperture formed therethrough adapted to be brought into axial alinement with the remainder of the telescope or instrument, one arm, for example, being provided with a Wollaston or other form of prism 92, as is customary to use in an ophthalmometer, while the other arms bear supplemental lenses 32 one being slightly convex and the other being concave, as clearly shown in the drawing, and all capable of selective shifting, and in addition to the lenses already in the device to give desired focal effect, and the like, without necessitating undue movement of the several adjustable portions of the instrument. Of course it is to be understood that the amount of surface curvature of the various lenses is variable as a number of different combinations are possible, this being dependent upon the technical skill of the instrument designer. Obviously, the several lenses have to be properly coordinated to produce the desired results.

The instrument is intended for two distinct and different types of work: the one, work as an ophthalmometer in which the test is carried out by viewing the reflected image of the mires, as they are termed, or certain objects upon the cornea, and determining their relationship or adjusting these or other objects to definitely known lateral positions for determination of the angle of vision of the eye without shifting; or as a perimeter and also for use in a direct examination of the eye itself as a corneal microscope or ophthalmoscope, in which event it is necessary that the eye be suitably illuminated to permit of vision thereinto and of proper viewing of the magnified parts. In the use of the instrument as a perimeter or ophthalmoscope the tube is preferably rotatable and the degree to which the same is rotated is determined by viewing the relationship between the witness mark or indicator 33 and the axis scale 34 secured on the main head or carrier 17.

In the use of the instrument as an ophthalmometer, the main carriage 13 with its superstructure is moved to its most forward position, that is, to a position most distant from the patient, and the bladed carrier 30 is rotated to position the Wollaston prism 92 in alinement with the telescope lenses 23, 24 and 25. As has been previously pointed out, the general positioning of the device is accomplished by moving the carriage 13, and thereafter the exact focus of the lens system with relation to the patient's eye may be accomplished through the instrumentality of rack 17 and pinion 18 moving the telescope tube 21 axially. For this use of the instrument the arms 35 are preferably rigidly secured to the tube 21 and are provided with the mires or illuminated image boxes 36 slidably supported on the arms 35 and adjustable therealong as thru the engagement of the pinion 37 with the rack 38 see Figure III. These boxes carry within them the suitable lights or sources of illumination 39 adapted to shine out through the mire slots 40 when the covers 41 are raised, as is most clearly indicated in connection with Figures II and VII. In performing the tests these mires are suitably illuminated, and the instrument being aligned with the eye of the patient, the person making the test is at the right hand or angular side of the instrument, as shown in connection with Figures I and III, and looking through the telescope portion is able to see the reflection of the images of the mire on the eye of the patient and by in and out adjustment of the mires to cause them to assume desired relationship one to the other, the adjustment being determined by suitable indicia as at 42. The relationship and necessary adjustment of the merger, overlapping of the mires, and the like, having been determined in one meridian, the device as an entirety may be rotated and the reading taken to see whether the mires are in the same relationship, or if not what adjustment is necessary to restore the relationship to determine whether astigmatic defect is present in the eye of the patient, and if so the amount of that defect.

In addition to this test it is desired to use the instrument as a perimeter for which purpose the position of the carriage 13 and of the Wollaston prism 92 should be the same as heretofore described for the ophthalmometer. The arms 35 may be provided with the sliding extensions 43 bearing the terminal boxes 44 provided with a source of illumination as at 45, see Figure VI, and with the rotatable disc 46 bearing a plurality of tiny pieces of colored glass, or the like, 47. In conducting this test the arms are placed in one meridian and then in another to the desired extent and with the eye fixed on the aperture of the telescope or tube 21, determination is made of the amount of lateral vision which is suitably charted in the manner usual with perimetric tests. If desired in place of having the eye of the patient fixed merely on the aperture of the telescope or tube, the terminal end of the telescope may be hinged to swing to one side, as indicated in Figure X and the small button or object member 60 brought into position as a fixation point to aid in steadying the eye. The purpose of the disc 46 with its different colored glasses 47 is so that contrast may be made between the two boxes on opposite arms and more accurate readings obtained thru determination as to just what is seen at each side by the patient at a particular moment. In order that the test may be satisfactorily made with first one eye and then another in the foregoing as well as the subsequently described operations, the post 20 is swivelled to the base 13, as indicated at 48.

It is to be understood that the amount of adjustment of the perimeter test boxes is somewhat varied according to the desires of the individual eye testing specialist, and that these may be carried either as extensions of the arms 35, supplementing the mire boxes 36, or in some instances may be carried by a separate pair of arms disposed at right angles to the arms 35, so that they may be brought very near together as well as to widely separated positions, in either event the rotation of the carrying tube 21 serving to position the members as desired during the testing operation.

It is to be noted in the form of instrument illustrated that the sighting or telescope tube is shown as provided with a screen at 49, the lens system being such as to focus the reflected image of the mires on the screen where it will be properly magnified and viewed through the eye piece lens 25. It will be understood that during this operation the Wollaston prism or its equivalent at 92 is preferably in position in the axis of the tube for doubling of the image of the mires and mergence of the doubled image on proper adjustment in the well known manner of operation of instruments of this type.

After these measurements have been properly taken, the next step in use of the instrument is as a corneal microscope for examination of the cornea of the eye. In carrying out this examination it is necessary that the eye be suitably illuminated, this being accomplished as by energizing of the light 50, this light being reflected as by the mirror 51 on the end of the tube 21 to illuminate the eye, and the device as an entirety being racked to intermediate position by moving the carrier 13 through the instrumentality of pinion 14 as is indicated in Figures I and III. In this position the member 30 is also rotated to throw the convex supplementary lens 32 into position in alinement with the telescope lenses 23, 24 and 25, shortening up the focal length of the instrument so that the cornea may be satisfactorily examined.

At the completion of this examination the instrument is then racked to its extreme rearward position for use as an ophthalmoscope, still employing the same manner of illumination to study the interior or fundus of the eye and the surface of the retina, the concave supplemental lens 32 being here employed, and being capable of back and forth adjustment to accurately focus the instrument for a particular eye.

An additional advantage of our instrument resides in the fact that it may not only be employed as a corneal microscope but also to photographically record the findings so secured. This result is accomplished as is indicated in Figure XI, by securing to the body portion 21 of the telescope the casing 63 of the camera member 64, which includes the focusing lens or lens system 65. This camera receives the radiations as laterally deflected by the reflecting and transmitting prism, designated as an entirety by the numeral 66, comprising a pair of prism members and a semi-reflecting semi-transparent screen portion 68 which will allow of vision therethrough as from the eye of the operator situated at the eye piece lens 25, and also a lateral deflection permitting of photographing of that which is seen by the eye of the operator. Another feature of this double prism 66 is that if desired the rear face, as at 69, may be ground or frosted so that it will also serve as a frosted glass screen 49 normally employed in connection with the instrument. It is, of course, to be understood that while we particularly prefer the arrangement here shown, in that it enables the doctor or person performing the test to keep a continuous watch on the eye of the patient and its conditions up to and during the time the photograph is taken, that if preferred the instrument might be employed with a photographic attachment disposed at the eye piece 25, or the like, the same result, that is, the photographing of the individual ocular conditions of the patient, being secured.

From the foregoing description taken in connection with the accompanying drawings, the general principles of construction and operation of our combined purpose eye testing instrument should be readily understood, and it will be seen that we have provided a simple compact and efficient instrument capable of substitution for a plurality of different instruments now on the market, and which will in a desirable manner accomplish all the results previously requiring these several instruments for accomplishment, thus relieving the work of the doctor or eye tester and the patient in the proper eye examination.

We claim:

1. In a diagnostic instrument, a support, a tube on the support, a telescope lens system mounted in the tube, means for changing the telescope to an ophthalmoscope or ophthalmometer, and means for refocusing the lens system to compensate for change therein.

2. In a diagonostic instrument, a support, a tube on the support, a telescope lens system in the tube, supplementary lenses carried by the tube, means for selectively positioning said supplementary lenses within the system, thereby altering the function and operation of the instrument, and means for refocusing the lens system to accommodate the selected supplementary lens.

3. A device of the character described, including a sighting tube, a lens system within the tube whereby the same may be used to view the fundus oculi, a reflecting transmitting prism in the tube, and means for permanently recording the reflected image of the tube.

4. A device of the character described, the combination with a sighting tube having an eye examining lens system contained therein, of a combined transmitting and reflecting prism contained in the tube and having a ground glass portion receiving the transmitted image and a photographic mechanism carried by the tube and disposed to receive the reflected image.

5. In a device of the character described, a support, a tube mounted on the support, a telescope lens system in the tube, an arcuate member mounted on the tube adjacent one end thereof and containing the end of the tube within its concavity, means to rotate the arcuate member about the axis of the tube, mires movable about the arcuate member, illuminating means in the mires adapted to shine into the eye of the patient when the eye is aligned with the tube, a prism lens mounted in the tube, and means to move the prism lens into and out of alignment with the telescope lens system.

6. In a device of the character described, a support, a tube mounted on the support, a telescope lens system in the tube, an arcuate member mounted on the tube adjacent one end thereof and containing the end of the tube within its concavity, means to rotate the arcuate member about the axis of the tube, mires movable about the arcuate member, illuminating means in the mires adapted to shine into the eye of the patient when the eye is aligned with the tube, a prism lens mounted in the tube, means to move the prism lens into and out of alignment with the telescope lens system, and means to focus the prism in the telescope lens system.

7. In a device of the character described, a support, a tube mounted on the support, a telescope lens system in the tube, an arcuate member mounted on the tube adjacent one end thereof and containing the end of the tube within its concavity, means to rotate the arcuate member about the axis of the tube, mires movable about the arcuate member, illuminating means in the mires adapted to shine into the eye of the patient when the eye is aligned with the tube, a prism lens mounted in the tube, means to move the prism lens into and out of alignment with the telescope lens system, means to focus the prism in the telescope lens system, and a screen in the tube adjacent the eye piece of the telescope lens system adapted to receive the image of the eye.

8. In a device of the character described, a support, a tube mounted on the support, a telescope lens system in the tube, an arcuate member mounted on the tube adjacent one end thereof and containing the end of the tube within its concavity, means to rotate the arcuate member about the axis of the tube, mires movable about the arcuate member, illuminating means in the mires adapted to shine into the eye of the patient when the eye is aligned with the tube, a convex lens mounted in the tube, means to move the convex lens into and out of alignment with the telescope lens system, means to move the convex lens longitudinally in the tube to focus it in the telescope lens system, and means to illuminate the eye of the patient when the eye is aligned with the tube.

9. In a device of the character described, a support, a tube mounted on the support, a telescope lens system in the tube, an arcuate member mounted on the tube adjacent one end thereof and containing the end of the tube within its concavity, means to rotate the arcuate member about the axis of the tube, mires movable about the arcuate member, illuminating means in the mires adapted to shine into the eye of the patient when the eye is aligned with the tube, a concave lens in the tube, means to move the concave lens into and out of alignment with the telescope lens system, means to move the concave lens longitudinally in the tube to focus it in the telescope lens system, and means to illuminate the eye of the patient when the eye is aligned with the tube.

10. In a device of the character described, a support, a tube mounted on the support, a movable sleeve within the tube, a lens mount pivoted in the sleeve, a telescope lens system in the tube longitudinally aligned with the sleeve, a source of light, means for directing light from the source of light onto an eye aligned with the axis of the tube, a convex lens mounted in the lens mount, means to move the lens mount with its convex lens into and out of alignment with the telescope lens system, and means to move the sleeve with the convex lens longitudinally in the tube to focus it in the telescope lens system.

11. In a device of the character described, a support, a tube mounted on the support, a movable sleeve within the tube, a lens mount pivoted in the sleeve, a telescope lens system in the tube longitudinally aligned with the sleeve, a source of light, means for directing the light from the source of light into an eye aligned with the axis of the tube, a concave lens mounted in the lens mount, means to move the lens mount with its concave lens into and out of alignment with the telescope lens system, and means to move the sleeve with the concave lens longitudinally in the tube to focus it in the telescope lens system.

12. In a device of the character described, a support, a tube on the support having a transverse opening therein, a telescope lens system in the tube, a lens mount pivoted in the tube, a plurality of lenses mounted in the lens mount, means to move any one of said lenses into axial alignment with the telescope lens system and the other lenses out of axial alignment therewith simultaneously, a prism in the telescope lens system aligned with the transverse opening in the tube, and a camera support in line with said opening and prism.

13. In a device of the character described, a support, a tube on the support, a telescope lens system in the tube, a lens mount pivoted within the tube, a plurality of lenses in the lens mount, means to move any one of said lenses into alignment with the axis of the telescope lens system and the others of said lenses out of line therewith simultaneously, an image screen in the telescope lens system, and a camera supported in line with said screen.

14. In a device of the character described, a support, a tube mounted on the support, a member mounted to slide longitudinally in the tube, a lens mount movably mounted on said member adapted to move transversely to the longitudinal axis of the tube to move the lens position into and out of alignment with said axis, a telescope lens system in the tube longitudinally aligned therewith, a source of light, means for directing light from the source of light onto an eye aligned with the axis of the tube, a convex lens mounted in the lens mount, means to move the lens mount with its convex lens into and out of alignment with the telescope lens system, and means to move the slidable member with the convex lens longitudinally in the tube to focus it in the telescope lens system.

15. In a device of the character described, a support, a tube mounted on the support, a member mounted to slide longitudinally in the tube, a lens mount movably mounted on said member adapted to move transversely to the longitudinal axis of the tube to move the lens position into and out of alignment with said axis, a telescope lens system in the tube longitudinally aligned therewith, a source of light, means for directing the light from the source of light onto an eye aligned with the axis of the tube, a concave lens mounted in the lens mount, means to move the lens mount with its concave lens into and out of alignment with the telescope lens system, and means to move the slidable member with the concave lens longitudinally in the tube to focus it in the telescope lens system.

16. In a device of the character described, a support, a tube on the support having a transverse opening therein, a telescope lens system in the tube, a lens mount movably mounted in said tube and adapted to move transversely to the longitudinal axis of the tube to move the lens position into and out of alignment with said axis, a plurality of lenses mounted in the lens mount, means to move any one of said lenses into axial alignment with the telescope lens system and the other lenses out of axial alignment therewith simultaneously, a prism in the telescope lens system aligned with the transverse opening in the tube and a camera supported in line with said opening and prism.

17. In a device of the character described, a support, a tube on the support, a telescope lens system in the tube, a lens mount movably mounted in said tube and adapted to move transversely to the longitudinal axis of the tube to move the lens position into and out of alignment with said axis, a plurality of lenses in the lens mounting, means to move any one of said lenses into alignment with the axis of the telescope lens system and the others of said lenses out of line therewith simultaneously, an image screen in the telescope lens system and a camera supported in line with said screen.

BERNARD P. CURRIER.
BURNHAM W. KING.